United States Patent [19]

Arneson et al.

[11] Patent Number: 5,299,774
[45] Date of Patent: Apr. 5, 1994

[54] DIAPHRAGM CONTROLLED IRRIGATION VALVE WITH CAPTIVATED BLEED SCREW

[75] Inventors: Creel M. Arneson, Duarte; David Flores, Rowland Heights, both of Calif.

[73] Assignee: Champion Brass Manufacturing dba Champion Irrigation Products, Los Angeles, Calif.

[21] Appl. No.: 9,683

[22] Filed: Jan. 27, 1993

[51] Int. Cl.[5] ............... F16K 31/145; F16K 31/165; F16K 31/40
[52] U.S. Cl. ............................ 251/26; 137/218; 251/30.02; 251/46; 251/217; 251/284
[58] Field of Search ............... 137/218; 251/26, 30.02, 251/46, 217, 284

[56] References Cited

U.S. PATENT DOCUMENTS

| 1,465,004 | 8/1923 | Sherman et al. | 251/217 |
| 2,677,526 | 5/1954 | Johnson | 251/284 X |
| 3,005,616 | 10/1961 | Seele | 137/218 X |
| 3,255,775 | 6/1965 | Albro et al. | 251/284 X |
| 3,323,546 | 6/1967 | Lord | 251/284 X |
| 3,338,549 | 8/1967 | Anthes et al. | 251/284 X |
| 3,472,427 | 10/1969 | Schaefer | 251/284 X |
| 3,811,650 | 5/1974 | Dehar | 251/217 X |
| 3,910,550 | 10/1975 | Nelson | 251/217 X |
| 4,105,186 | 8/1978 | Eby | 251/46 X |
| 4,132,237 | 1/1979 | Kennedy et al. | 281/46 X |

*Primary Examiner*—Gerald A. Michalsky
*Attorney, Agent, or Firm*—Freilich Hornbaker Rosen

[57] ABSTRACT

A diaphragm controlled irrigation valve (20) is disclosed which includes a captivated relief member (60). The captivation is achieved by a stop (100) which radially extends from the member to abut the valve housing (23).

5 Claims, 2 Drawing Sheets

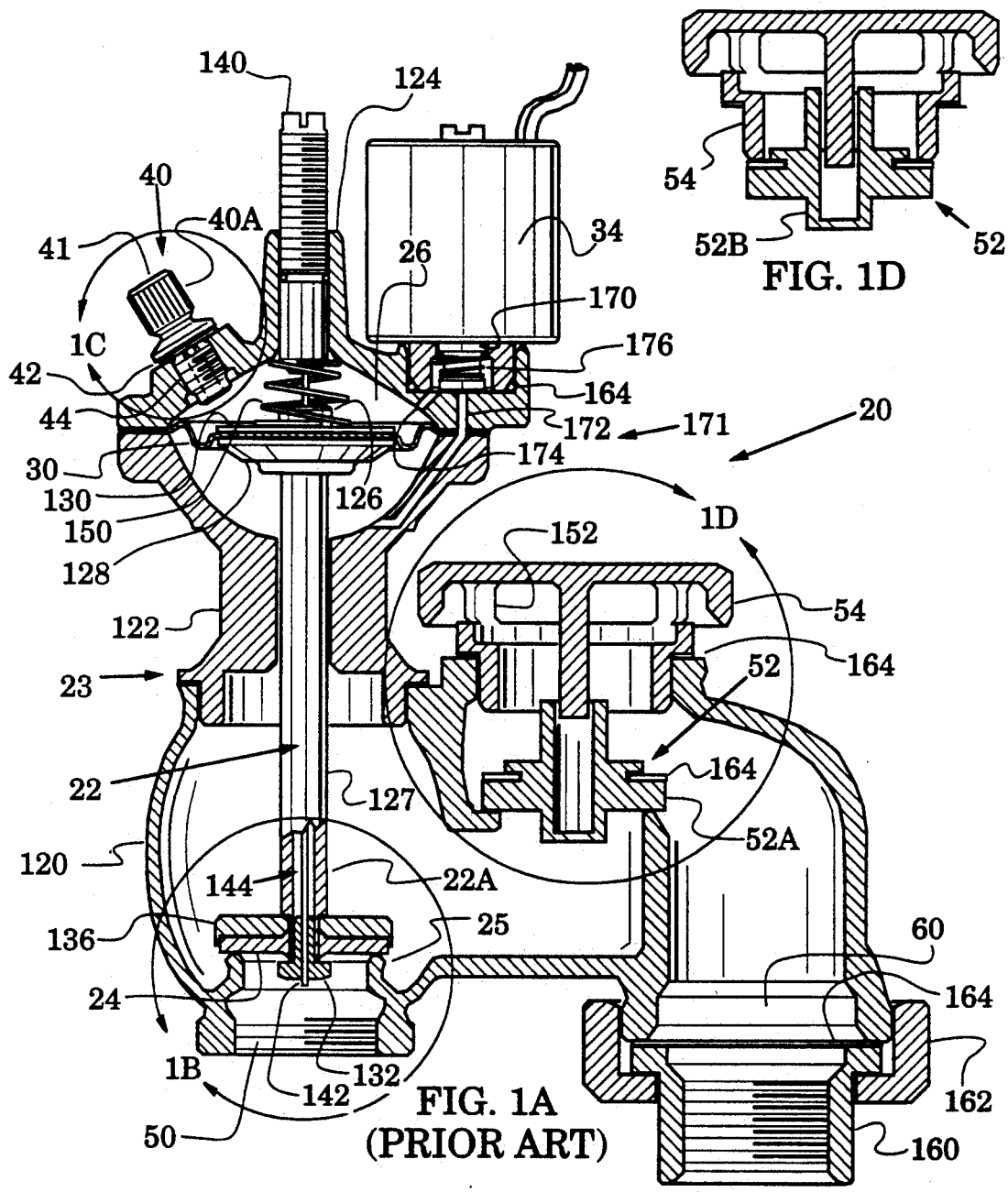
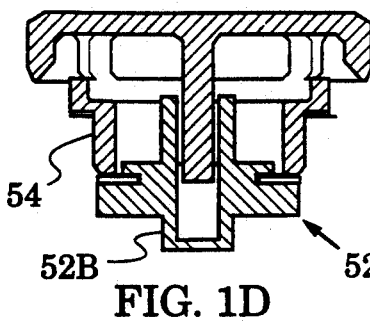
FIG. 1D
FIG. 1A (PRIOR ART)
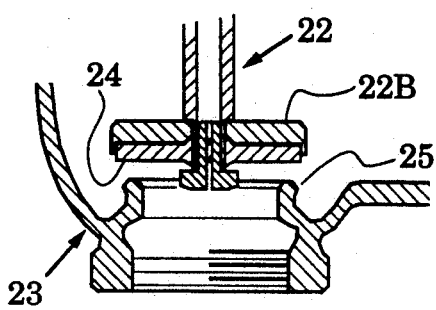
FIG. 1B
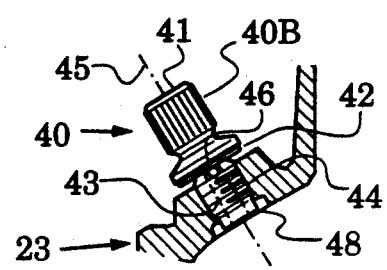
FIG. 1C

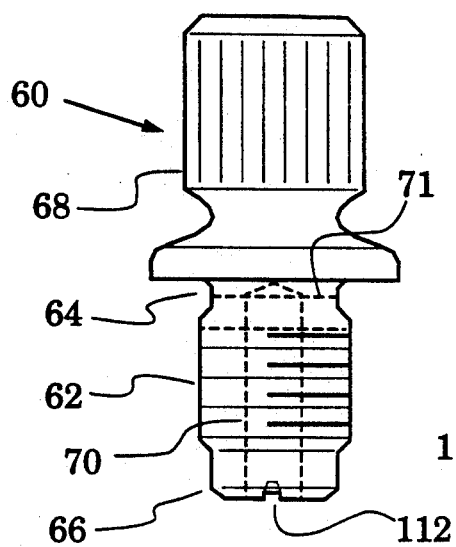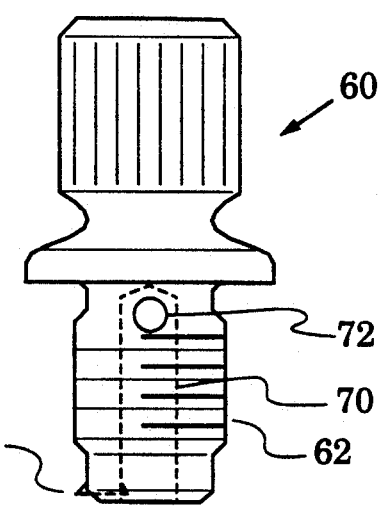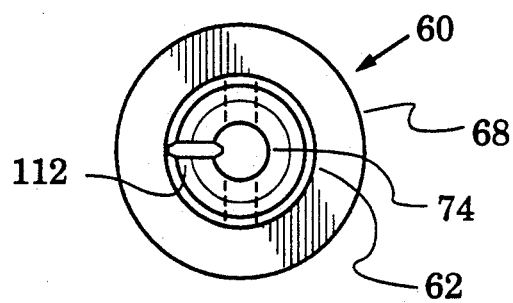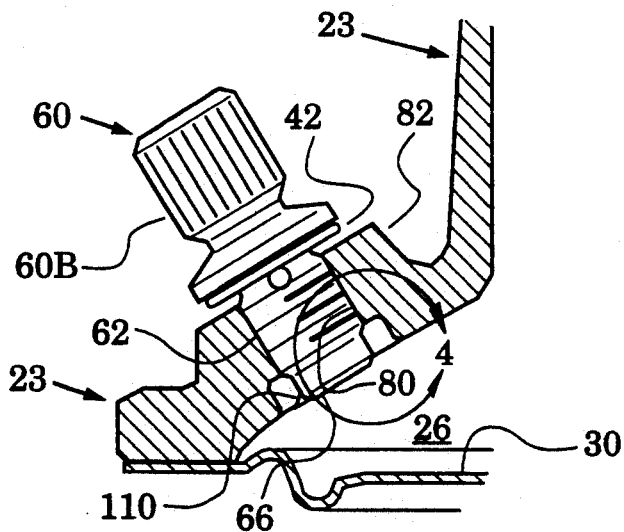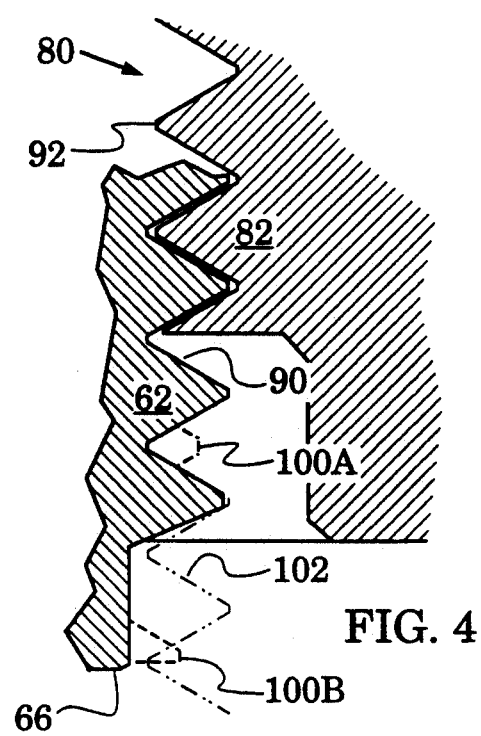

DIAPHRAGM CONTROLLED IRRIGATION VALVE WITH CAPTIVATED BLEED SCREW

TECHNICAL FIELD

The present invention relates generally to irrigation valves and more particularly to valves activated by pressure relief.

BACKGROUND ART

Diaphragm controlled valves are used for a variety of irrigation purposes, e.g., watering of lawns and crops. Although such valves are often electronically actuated, they typically include a manually adjustable bleed screw that actuates the valve by venting water pressure from one side of a diaphragm. An anti-siphon valve is sometimes added to prevent contamination of the water supply.

DISCLOSURE OF INVENTION

The present invention is directed to an irrigation valve assembly incorporating a manually adjustable pressure relief member, i.e., a bleed screw, configured to prevent its removal from the valve assembly. The valve assembly includes a housing defining an opening to an internal chamber. In accordance with the invention, the pressure relief member is mounted in the opening for restricted movement between a first position which seals the opening and a second position which vents the chamber.

In a preferred embodiment, the housing opening is internally threaded and accommodates an externally threaded pressure relief member. Rotation of the relief member causes it to move axially between said first sealing position and said second venting position. The relief member is prevented from exiting the opening by a radially extending stop formed proximate to its inner end and oriented to abut the housing.

The novel features of the invention are set forth with particularly in the appended claims. The invention will be best understood from the following description when read in conjunction with the accompanying drawings.

BRIEF DESCRIPTION OF DRAWINGS

FIG. 1A is a sectional elevation view of an exemplary prior art diaphragm controlled irrigation valve;

FIG. 1B is a view of the structure within the curved line 1B of FIG. 1A illustrating another apparatus position;

FIG. 1C is a view of the structure within the curved line 1C of FIG. 1A illustrating another apparatus position;

FIG. 1D is a view of the structure within the curved line 1D of FIG. 1A illustrating another apparatus position;

FIG. 2A is a side elevation view of a preferred bleed screw embodiment, in accordance with the present invention, for use in the valve of FIG. 1;

FIG. 2B is a front elevation view of the screw of FIG. 2A;

FIG. 2C is a bottom plan view of the screw of FIG. 2A;

FIG. 3 is an enlarged view similar to FIG. 1C showing the bleed screw thereof replaced with the bleed screw of FIG. 2A; and FIG. 4 is an enlarged view of the structure within the curved line 4 of FIG. 3.

MODES FOR CARRYING OUT THE INVENTION

An exemplary prior art diaphragm controlled irrigation valve 20 is illustrated in the sectional elevation view of FIG. 1A. The irrigation valve 20 includes a piston 22 slidably mounted in a housing 23. The piston 22 has a closed position 22A wherein an annular face 24 is driven to abut a valve seat 25 by water pressure in a chamber 26 pressing against an annular diaphragm 30. If this water pressure is reduced by venting pressure from the chamber 26, the piston 22 is driven upward to an open position 22B where the face 24 is spaced from the valve seat 25 as shown in FIG. 1B (a view of the structure within the curved line 1B of FIG. 1A).

Venting of pressure from the chamber 26 can be implemented manually with a bleed screw 40. The screw 40 defines an enlarged head 41 and is threadably mounted in the housing 23. The screw may be rotated from a sealed position wherein the head 41 abuts the housing 23 to a vent position wherein the head 41 is spaced from the housing 23. In the sealed position, an annular gasket, e.g., an O ring 42, is preferably disposed between the head 41 and the housing 23 as shown in the sealed position 40A of FIG. 1A. From the position 40A, the screw moves along its axis 45 to the open position 40B as shown in FIG. 1C; a view of the structure within the curved line 1C of FIG. 1A.

When the screw 40 is in the vent position 40B, a passage 43 (shown in FIG. 1C) communicates with the chamber 26 to vent pressure thereaway. The passage 43 is defined through the cylindrical body 44 of the screw. The entrance of this passage is proximate to the body end 48 that extends through the housing 23 and the exit 46 is proximate to the screw head 41.

Therefore, turning the bleed screw 40 to position 40B opens the irrigation valve 20. Water then flows from the housing inlet port 50 to force an anti-siphon valve 52 upward from the position 52A to the position 52B shown in FIG. 1D which is a view of the structure within the curved line 1D of FIG. 1. Water then continues to enter the housing inlet port 50 and exit the housing outlet port 60 to supply an irrigation system which may attached thereto.

The bleed screw 40 may be used to open the irrigation valve 20 when testing and adjusting an irrigation system. Or, if a user of the valve is closer to it than to the electronic control of the solenoid 34, the bleed screw may be a more convenient way of opening the valve 20. Again, if a valve 20 is located in a subsurface valve box and is flooded, the electrical power must be removed and the bleed screw used to operate the valve. Finally, the bleed screw 40 is the only way to open the valve 20 when there is an electrical power outage. Thus the bleed screw 40 finds use in a variety of situations.

Unfortunately, if the screw 40 is turned too far it comes out of the housing 23 and can be lost or misplaced. In this case, all control of the valve is lost because water pressure is permanently vented from the chamber 26 and the valve is inoperative until a replacement screw can be obtained. Valves are also rendered inoperative when the bleed screw is removed by vandals, either in the store or the field.

Therefore, in accordance with the present invention, a captivated pressure relief member is provided which inhibits removal thereof from the housing 23. A preferred embodiment is shown in FIGS. 2A, 2B and 2C which respectively are side elevation, front elevation and bottom plan views of a bleed screw 60. Similar to the bleed screw 40 of FIGS. 1A and 1C, the screw 60 has a cylindrical body 62 with first and second ends 64, 66. The end 64 terminates in an enlarged head 68. A passage is formed through the body 62 by intersecting bores 70, 71 creating a passage exit 74 proximate to the second end 66 and two passage entries 72 proximate to the head 68. A helical thread is defined on the body 62.

However, unlike the bleed screw 40, the screw 60 has a stop which captivates the screw within the housing 23. The stop is best understood with reference to the mating threads between the screw 60 and the housing 23. In FIG. 3, which is an enlarged view similar to FIG. 1C, it is seen that a opening 80 through the housing wall 82 communicates with the chamber 26 defined between the diaphragm 30 and the housing 23. The threads of this opening 80 may be considered to be a helical ridge on the wall of the opening. Accordingly, the mating threads on the outer surface of the screw body 62 may be considered to be a helical groove that receives the opening ridge as the screw 60 is turned within the opening 80.

FIG. 4 is an enlarged view of the structure within the curved line 4 of FIG. 3 showing the mated threads of the screw body 62 and the opening 80. As shown, the helical groove 90 defined by the body 62 receives the helical ridge 92 defined by the opening 80. An imaginary extension 102 of the body heilical groove 90 is shown descending from the groove end.

It is apparent that a stop 100 consisting of a member 100A (shown by a broken line for clarity of illustration) radially extending from the body 62 will abut the opening ridge 92 when the screw body 62 is turned sufficiently far into the housing wall 82. Alternatively, it is apparent that a member 100B (again shown by a broken line for clarity of illustration) radially extending from the body 62 proximate to the body end 66 will also abut the opening ridge 92 and retain the screw 60 in the housing 23. The radial extension of the stop 100 should be sufficient to abut the ridge even under the maximum radial movement of the screw 60 due to dimensional tolerances between the helical groove 90 and the helical ridge 92.

Returning to FIGS. 2A, 2B and 2C, it is seen that the embodiment 60 defines a stop 110 similar to the extension 100B of FIG. 4. This stop may be realized by a deforming operation typically referred to as "staking" in which material of the body end 66 is forced upward and outward to form the outline 112. The stop 110 is also shown in FIG. 3 abutting the wall of the opening 80.

Another preferred embodiment of the captivated bleed screw may be formed by bonding material, e.g., by a welding or brazing operation, to the body 62 to form a stop similar to the member 100A or 100B as shown in FIG. 4. The operations of bonding material to the body 62 or deforming the body 62 may be performed subsequent to installation of the screw 60 into the valve housing 23.

Embodiments of the invention may be formed by other radial extensions carried by the bleed screw second end (66 in FIG. 3) to abut the housing (23 in FIG. 3) for retaining the relief member therein. For example, a snap ring could be inserted into a slot defined in the second end.

Returning now to the structure of FIG. 1A in detail, it is first observed that the housing 23 is made up of mated portions such as the body 120, the throat 122 and bonnet 124. The chamber 26 is defined between the housing 23 and the annular diaphragm 30 attached thereacross. A screw 126 threaded into the upper end of a hollow piston rod 127 captivates the diaphragm 30 between an annular base 128 and a flat washer 130. At the lower end of the rod 127 a screw 132 captivates the resilient annular face 24 and face seat 136 to the rod.

An adjustment screw 140 is threadably mounted in the bonnet 124 with an annular O ring sealing the interface therebetween. Descending from the lower end of the screw 140 is a metering pin 142 which extends downward through coaxial holes in screws 126 and 132, the hollow rod 127, the flat washer 130, the annular diaphragm 30, the annular base 128 and the annular face 24. Thus a conduit is defined that is coaxial with the metering pin 142 and communicates between the inlet port 50 and the chamber 26. This conduit is collectively referenced as 144 in FIG. 1 and functionally comprises a conduit through the annular face 24 and annular diaphragm 30.

A spring 150 is disposed between the bonnet 124 and the washer 130. The lower end of the adjustment screw 140 abuts the screw 126 to set the piston open position 22B (FIG. 1B). When the piston is in position 22A of FIG. 1A, the valve 52 drops to position 52A allowing atmospheric pressure through windows 152 of the cap 54. This prevents a vacuum forming above the outlet port 60 and hence prevents a siphoning water flow back to the inlet port 50.

Nut 160 and collar 162 facilitate installation of the valve 20 into a closed system since the port 50 can be threadably installed first to a water supply, and the nut 160 subsequently threaded onto the irrigation system at the outlet port 60 and finally the collar 162 threaded onto the body 120. Annular gaskets, collectively referenced as 164, are typically used to enhance sealing on the valve 52, the cap 54, the collar 162 and the solenoid 34.

Attention is now directed to operational details of the irrigation valve 20 of FIGS. 1A, 1B, 1C and 1D. When the solenoid 34 is actuated it draws its piston 170 upward to open a passage 171 formed by bores 172, 174 in the housing 23. When the solenoid is not actuated the piston 170, aided by a small spring 176, drops to close off the passage 171.

When the bleed screw 40 and piston 176 both seal off any venting of the chamber 26, water from the inlet port 50 passes through the conduit 144 to fill the chamber 26. Water pressure is now exerted against the diaphragm 30 and the piston face 24 and, because the area of the diaphragm 30 exceeds that of the piston face 24, the face continues to abut the seat 25 and the valve remains closed.

If the solenoid piston 170 is raised to open the passage 171 or the bleed screw is turned to open passage 43 therethrough the pressure drops in the chamber 26 and the piston 22 moves to position 22B shown in FIG. 1B. The passage 171 vents the chamber 26 to the low water pressure present on the downstream side of the seat 25 while the bleed screw vents the chamber 26 to the outside atmospheric pressure. When both of these vent passages are closed, water rises through the conduit 144 and pressure again builds in the chamber 26 to close the valve. The spring 150 initiates this return action.

Although the apparatus of FIG. 1 has been collectively referred to herein as a diaphragm controlled irrigation valve, it is sometimes known as a automatic anti-siphon valve. It is also common in the art to refer to an assembly of the body 120, cap 54 and valve 52 as an anti-siphon valve and an assembly of the remainder of FIG. 1A (except nut 160 and collar 162) as an electric or automatic actuator.

When the anti-siphoning provision is not needed, as in field crop irrigation, an electric diaphragm valve may be used. The electric diaphragm valve is formed by combining the electric actuator portion of FIG. 1 (as described above) with a simple housing that has coaxial inlet and outlet ports separated by a seat similar to the seat 25. This housing does not include structure similar to the cap 54 and valve 52. Typically, in the electric diaphragm valve a face similar to the face 24 is directly attached to the diaphragm, i.e. the piston rod 127 of FIG. 1 is not required. Such electric diaphragm valves typically employ a bleed screw functionally as shown in FIG. 1 and thus, the teachings of the invention are directly applicable.

From the foregoing it should now be recognized that embodiments of a diaphragm controlled irrigation valve have been disclosed herein having a pressure relief member configured for captivation thereof. An apparatus in accordance with the present invention permits installation, adjustment, use and maintenance of irrigation valves without fear of accidental loss of the bleed screw causing the valve to be inoperative. Such apparatus are also resistant to vandalism.

The preferred embodiments of the invention described herein are exemplary and numerous modifications, dimensional variations and rearrangements can be readily envisioned to achieve an equivalent result, all of which are intended to be embraced within the scope of the appended claims.

What is claimed is:

1. An irrigation valve assembly comprising:
   a housing defining a fluid inlet and a fluid outlet and having an exterior wall enclosing an internal chamber;
   means for pressurizing said chamber;
   a diaphragm mounted in said housing configured to assume a first orientation when said chamber is pressurized and a second orientation when said chamber is vented;
   valve means responsive to said diaphragm assuming said first and second orientations for respectively closing and opening a path from said fluid inlet to said fluid outlet;
   a cylindrical opening extending through said housing exterior wall to said chamber; and
   a manually operable pressure relief member mounted in said opening for movement between a first position sealing said chamber and a second position venting said chamber,
   said pressure relief member comprising a bleed screw mounted in said opening for reciprocal axial movement between said first and second positions, said bleed screw having axially displaced inner and outer ends;
   an enlarged manually rotatable head extending from said bleed screw outer end disposed exteriorly of said housing wall, said head defining a radially oriented sealing surface located to abut said housing wall when said bleed screw is in said first position;
   an internal passage formed in said bleed screw including an axial bore having an entrance opening at said inner end and a radial bore having an exit opening located between said inner end and said sealing surface, said exit opening being located exteriorly of said housing wall when said bleed screw is in said second position; and
   a stop member on said bleed screw proximate to said inner end extending radially outward for engaging said housing wall in said chamber to prevent removal of said bleed screw from said opening.

2. The valve assembly of claim 1 further including an annular sealing gasket disposed around said bleed screw between said sealing surface and said exit opening.

3. The valve assembly of claim 1 wherein said bleed screw is deformed proximate to said inner end to form said stop member.

4. The valve assembly of claim 1 further including an electronically operable pressure relief member communicating with said chamber for selectively venting pressure therefrom.

5. The valve assembly of claim 1 further including a first helical thread internally formed in said opening and a second helical thread externally formed on said bleed screw.

* * * * *